US010909110B1

(12) United States Patent
Bernbo et al.

(10) Patent No.: US 10,909,110 B1
(45) Date of Patent: Feb. 2, 2021

(54) DATA RETRIEVAL FROM A DISTRIBUTED DATA STORAGE SYSTEM

(71) Applicant: Pure Storage, Inc., Mountain View, CA (US)

(72) Inventors: Stefan Bernbo, Karlskrona (SE);
Christian Melander, Rodeby (SE);
Roger Persson, Karlskrona (SE);
Gustav Petersson, Karlskrona (SE)

(73) Assignee: Pure Storage, Inc., Mountain View, CA (US)

( * ) Notice: Subject to any disclaimer, the term of this patent is extended or adjusted under 35 U.S.C. 154(b) by 0 days.

(21) Appl. No.: 16/723,801

(22) Filed: Dec. 20, 2019

Related U.S. Application Data

(63) Continuation of application No. 14/291,223, filed on May 30, 2014, now Pat. No. 10,579,615, which is a
(Continued)

(51) Int. Cl.
*G06F 15/16* (2006.01)
*G06F 16/24* (2019.01)
(Continued)

(52) U.S. Cl.
CPC .......... *G06F 16/24* (2019.01); *G06F 16/1834* (2019.01); *G06F 16/2365* (2019.01); *H04L 67/10* (2013.01)

(58) Field of Classification Search
USPC ................ 709/200, 219, 232–233; 711/171; 707/769
See application file for complete search history.

(56) References Cited

U.S. PATENT DOCUMENTS

| 3,707,707 A | 12/1972 | Spencer et al. |
| 5,713,017 A | 1/1998 | Lin et al. |

(Continued)

FOREIGN PATENT DOCUMENTS

| CN | 1726454 | 1/2006 |
| CN | 101710339 | 5/2010 |

(Continued)

OTHER PUBLICATIONS

Extended European Search Report received in EP Application No. 19169627.7 dated Sep. 6, 2019.
(Continued)

*Primary Examiner* — Anthony Mejia
(74) *Attorney, Agent, or Firm* — ALG Intellectual Property, LLC

(57) ABSTRACT

There is provided a method and server for retrieving data from a data storage system including a plurality of storage nodes. The method may include sending a multicast message to at least a subset of the storage nodes. The multicast message may include a request for the subset of storage nodes to send the data. The multicast message may further include a data identifier indicating the data to be retrieved. Moreover, the method may include receiving data from a first storage node of the subset of storage nodes. The data received from the first storage node may correspond to the requested data. At least the act of sending a multicast message or the act of receiving data from the first storage node may be performed on a condition that an estimated size of the data is less than a predetermined value.

15 Claims, 4 Drawing Sheets

Related U.S. Application Data continuation of application No. 13/224,433, filed on Sep. 2, 2011, now Pat. No. 8,769,138.

(51) Int. Cl.
*G06F 16/23* (2019.01)
*G06F 16/182* (2019.01)
*H04L 29/08* (2006.01)

(56) References Cited

U.S. PATENT DOCUMENTS

| | | |
|---|---|---|
| 5,787,247 A | 7/1998 | Morin et al. |
| 6,003,065 A | 12/1999 | Yan et al. |
| 6,021,118 A | 2/2000 | Houck et al. |
| 6,055,543 A | 4/2000 | Christensen et al. |
| 6,259,701 B1 | 7/2001 | Shur et al. |
| 6,345,308 B1 | 2/2002 | Abe |
| 6,389,432 B1 | 5/2002 | Pothapragada et al. |
| 6,401,120 B1 | 6/2002 | Gamache et al. |
| 6,470,420 B1 | 10/2002 | Hospodor |
| 6,510,162 B1 | 1/2003 | Fijolek et al. |
| 6,732,237 B1 | 5/2004 | Jacobs et al. |
| 6,775,688 B1 | 8/2004 | Kakimoto |
| 6,782,389 B1 | 8/2004 | Chrin et al. |
| 6,839,815 B2 | 1/2005 | Kagami et al. |
| 6,925,737 B2 | 8/2005 | Bolduan et al. |
| 6,985,956 B2 | 1/2006 | Luke et al. |
| 6,993,518 B2* | 1/2006 | Brinker ............... G06F 16/2445 |
| 7,032,168 B1 | 4/2006 | Gerace et al. |
| 7,039,661 B1 | 5/2006 | Ranade et al. |
| 7,200,664 B2 | 4/2007 | Hayden |
| 7,206,836 B2 | 4/2007 | Dinker et al. |
| 7,266,556 B1 | 9/2007 | Coates |
| 7,320,088 B1 | 1/2008 | Gawali |
| 7,340,510 B1 | 3/2008 | Liskov et al. |
| 7,352,765 B2 | 4/2008 | Dai et al. |
| 7,376,945 B1 | 5/2008 | Kakumani et al. |
| 7,385,978 B1 | 6/2008 | Yang et al. |
| 7,406,484 B1 | 7/2008 | Srinivasan et al. |
| 7,487,305 B2 | 2/2009 | Hill et al. |
| 7,503,052 B2 | 3/2009 | Castro et al. |
| 7,512,673 B2* | 3/2009 | Miloushev .......... G06F 11/1076 709/221 |
| 7,546,486 B2 | 6/2009 | Slik et al. |
| 7,565,419 B1 | 7/2009 | Kwiatkowski et al. |
| 7,568,069 B2 | 7/2009 | Jantz et al. |
| 7,574,488 B2 | 8/2009 | Matsubara |
| 7,590,672 B2 | 9/2009 | Slik et al. |
| 7,593,966 B2 | 9/2009 | Therrien et al. |
| 7,624,155 B1 | 11/2009 | Nordin et al. |
| 7,624,158 B2 | 11/2009 | Slik et al. |
| 7,631,023 B1 | 12/2009 | Kaiser et al. |
| 7,631,045 B2 | 12/2009 | Boerries et al. |
| 7,631,313 B2* | 12/2009 | Mayhew ............. G06F 13/4252 709/231 |
| 7,634,453 B1 | 12/2009 | Bakke et al. |
| 7,647,329 B1 | 1/2010 | Fischman et al. |
| 7,694,086 B1 | 4/2010 | Kulkarni et al. |
| 7,769,711 B2 | 8/2010 | Srinivasan et al. |
| 7,778,972 B1 | 8/2010 | Cormie et al. |
| 7,822,711 B1 | 10/2010 | Ranade |
| 7,822,766 B2 | 10/2010 | Arndt et al. |
| 7,840,992 B1 | 11/2010 | Dufrene et al. |
| 7,873,650 B1 | 1/2011 | Chapman et al. |
| 7,885,982 B2 | 2/2011 | Wight et al. |
| 7,953,083 B1 | 5/2011 | Evans et al. |
| 8,060,598 B1* | 11/2011 | Cook .................... H04L 45/16 709/224 |
| 8,073,881 B1 | 12/2011 | Georgiev |
| 8,190,561 B1 | 5/2012 | Poole et al. |
| 8,255,430 B2 | 8/2012 | Dutton et al. |
| 8,296,398 B2 | 10/2012 | Lacapra et al. |
| 8,401,997 B1 | 3/2013 | Tawri et al. |
| 8,417,828 B2* | 4/2013 | Ma ...................... H04L 65/80 709/231 |
| 8,443,062 B2 | 5/2013 | Voutilainen et al. |
| 8,468,214 B1 | 6/2013 | Bourlas et al. |
| 8,504,758 B1 | 8/2013 | McHugh et al. |
| 8,561,115 B2* | 10/2013 | Hattori ............ H04N 21/26275 725/91 |
| 8,577,957 B2* | 11/2013 | Behar ................ G06F 3/0362 709/203 |
| 8,650,365 B2* | 2/2014 | Bernbo ................ G06F 3/065 711/151 |
| 8,688,630 B2* | 4/2014 | Bernbo ............... G06F 11/2094 707/610 |
| 8,707,091 B2 | 4/2014 | Gladwin et al. |
| 8,745,342 B2 | 6/2014 | Amano et al. |
| 8,769,042 B2 | 7/2014 | Sedeffow |
| 8,843,710 B2* | 9/2014 | Bernbo ................ G06F 3/067 711/151 |
| 8,898,236 B2 | 11/2014 | Kanakadandi et al. |
| 9,098,683 B2 | 8/2015 | Rose |
| 9,225,780 B2 | 12/2015 | Braam et al. |
| 9,367,448 B1 | 6/2016 | Botelho et al. |
| 9,471,593 B1 | 10/2016 | Anderson et al. |
| 9,928,174 B1 | 3/2018 | Connell |
| 2001/0034812 A1 | 10/2001 | Ignatius et al. |
| 2001/0047400 A1 | 11/2001 | Coates et al. |
| 2001/0048728 A1 | 12/2001 | Peng |
| 2002/0042693 A1 | 4/2002 | Kampe et al. |
| 2002/0073086 A1 | 6/2002 | Thompson et al. |
| 2002/0103888 A1 | 8/2002 | Janz et al. |
| 2002/0114341 A1 | 8/2002 | Sutherland et al. |
| 2002/0145786 A1 | 10/2002 | Chang et al. |
| 2002/0156912 A1 | 10/2002 | Hurst et al. |
| 2003/0026254 A1 | 2/2003 | Sim |
| 2003/0065663 A1 | 4/2003 | Chu |
| 2003/0097468 A1 | 5/2003 | Hamadi |
| 2003/0120654 A1 | 6/2003 | Edlund et al. |
| 2003/0126122 A1 | 7/2003 | Bosley et al. |
| 2003/0145127 A1 | 7/2003 | Unice |
| 2003/0154238 A1 | 8/2003 | Murphy et al. |
| 2003/0172089 A1 | 9/2003 | Douceur et al. |
| 2003/0177261 A1 | 9/2003 | Sekiguchi et al. |
| 2003/0233455 A1 | 12/2003 | Leber et al. |
| 2004/0010654 A1 | 1/2004 | Yasuda et al. |
| 2004/0030787 A1 | 2/2004 | Jandel et al. |
| 2004/0059805 A1 | 3/2004 | Dinker et al. |
| 2004/0064729 A1 | 4/2004 | Yellepeddy |
| 2004/0078466 A1 | 4/2004 | Coates et al. |
| 2004/0088297 A1 | 5/2004 | Coates et al. |
| 2004/0088646 A1 | 5/2004 | Yeager et al. |
| 2004/0111730 A1 | 6/2004 | Apte |
| 2004/0243675 A1* | 12/2004 | Taoyama ................ H04L 67/34 709/205 |
| 2004/0260775 A1* | 12/2004 | Fedele .................. H04L 51/063 709/206 |
| 2005/0010618 A1 | 1/2005 | Hayden |
| 2005/0015431 A1 | 1/2005 | Cherkasova |
| 2005/0015461 A1 | 1/2005 | Richard et al. |
| 2005/0038990 A1 | 2/2005 | Sasakura et al. |
| 2005/0044092 A1 | 2/2005 | Adya et al. |
| 2005/0055418 A1 | 3/2005 | Blanc et al. |
| 2005/0114711 A1 | 5/2005 | Hesselink et al. |
| 2005/0177550 A1 | 8/2005 | Jacobs et al. |
| 2005/0193245 A1 | 9/2005 | Hayden et al. |
| 2005/0204042 A1 | 9/2005 | Banerjee et al. |
| 2005/0246393 A1 | 11/2005 | Coates et al. |
| 2005/0256894 A1 | 11/2005 | Talanis et al. |
| 2005/0278552 A1 | 12/2005 | Delisle et al. |
| 2005/0283649 A1 | 12/2005 | Turner et al. |
| 2006/0023969 A1 | 2/2006 | Lara et al. |
| 2006/0031230 A1 | 2/2006 | Kumar |
| 2006/0031439 A1 | 2/2006 | Saffre |
| 2006/0047776 A1 | 3/2006 | Chieng et al. |
| 2006/0069800 A1* | 3/2006 | Li ....................... H04L 67/104 709/232 |
| 2006/0080574 A1 | 4/2006 | Saito et al. |
| 2006/0090045 A1 | 4/2006 | Bartlett et al. |
| 2006/0090095 A1 | 4/2006 | Massa et al. |
| 2006/0095397 A1 | 5/2006 | Torres et al. |
| 2006/0112154 A1 | 5/2006 | Douceur et al. |

(56) References Cited

U.S. PATENT DOCUMENTS

| | | |
|---|---|---|
| 2006/0218203 A1 | 9/2006 | Yamato et al. |
| 2006/0253504 A1 | 11/2006 | Lee et al. |
| 2006/0288053 A1 | 12/2006 | Holt et al. |
| 2007/0022087 A1 | 1/2007 | Bahar et al. |
| 2007/0022121 A1 | 1/2007 | Bahar et al. |
| 2007/0022122 A1 | 1/2007 | Bahar et al. |
| 2007/0022129 A1 | 1/2007 | Bahar et al. |
| 2007/0028291 A1 | 2/2007 | Brennan et al. |
| 2007/0055703 A1 | 3/2007 | Zimran et al. |
| 2007/0088703 A1 | 4/2007 | Kasiolas et al. |
| 2007/0094269 A1 | 4/2007 | Mikesell et al. |
| 2007/0094354 A1 | 4/2007 | Soltis |
| 2007/0189153 A1 | 8/2007 | Mason |
| 2007/0192451 A1 | 8/2007 | Tran et al. |
| 2007/0198467 A1 | 8/2007 | Wiser et al. |
| 2007/0220320 A1 | 9/2007 | Sen et al. |
| 2007/0220328 A1 | 9/2007 | Liu et al. |
| 2007/0242634 A1* | 10/2007 | Calcev .............. H04W 52/0225 370/318 |
| 2007/0255763 A1 | 11/2007 | Beyerle et al. |
| 2007/0276838 A1 | 11/2007 | Abushanab et al. |
| 2007/0288494 A1 | 12/2007 | Chrin et al. |
| 2007/0288533 A1* | 12/2007 | Srivastava .............. G06F 16/27 |
| 2007/0288638 A1 | 12/2007 | Vuong et al. |
| 2008/0005195 A1 | 1/2008 | Li et al. |
| 2008/0005199 A1 | 1/2008 | Chen et al. |
| 2008/0010372 A1 | 1/2008 | Khedouri et al. |
| 2008/0043634 A1 | 2/2008 | Wang et al. |
| 2008/0077635 A1 | 3/2008 | Sporny et al. |
| 2008/0084889 A1 | 4/2008 | Archer et al. |
| 2008/0104218 A1 | 5/2008 | Liang et al. |
| 2008/0104666 A1 | 5/2008 | Dillaway |
| 2008/0109830 A1 | 5/2008 | Giotzbach et al. |
| 2008/0126357 A1 | 5/2008 | Casanova et al. |
| 2008/0168157 A1 | 7/2008 | Marchand |
| 2008/0171556 A1 | 7/2008 | Carter |
| 2008/0172478 A1 | 7/2008 | Kiyohara et al. |
| 2008/0177767 A1 | 7/2008 | Lin et al. |
| 2008/0198752 A1 | 8/2008 | Fan et al. |
| 2008/0216174 A1 | 9/2008 | Vogel et al. |
| 2008/0235321 A1 | 9/2008 | Matsuo |
| 2008/0243950 A1 | 10/2008 | Webman et al. |
| 2008/0244674 A1 | 10/2008 | Hayashi et al. |
| 2008/0270524 A1* | 10/2008 | Gupta .................. H04L 67/10 709/203 |
| 2008/0270822 A1 | 10/2008 | Fan et al. |
| 2009/0043922 A1 | 2/2009 | Crowther |
| 2009/0083810 A1* | 3/2009 | Hattori ............ H04N 21/26616 725/92 |
| 2009/0113057 A1* | 4/2009 | Van der Merwe ........................ H04L 29/12349 709/227 |
| 2009/0132543 A1 | 5/2009 | Chatley et al. |
| 2009/0172211 A1 | 7/2009 | Perry et al. |
| 2009/0172307 A1 | 7/2009 | Perry et al. |
| 2009/0204636 A1* | 8/2009 | Li .................... G06F 16/137 |
| 2009/0228669 A1 | 9/2009 | Slesarev et al. |
| 2009/0249222 A1 | 10/2009 | Schmidt et al. |
| 2009/0271412 A1 | 10/2009 | Lacapra et al. |
| 2009/0287842 A1* | 11/2009 | Plamondon .......... H04L 47/822 709/233 |
| 2010/0036512 A1* | 2/2010 | Rutjes ................ H04L 12/282 700/90 |
| 2010/0057785 A1 | 3/2010 | Khosravy et al. |
| 2010/0070515 A1 | 3/2010 | Dutton et al. |
| 2010/0115078 A1 | 5/2010 | Ishikawa et al. |
| 2010/0146497 A1 | 6/2010 | Kogan et al. |
| 2010/0161138 A1 | 6/2010 | Lange et al. |
| 2010/0169391 A1 | 7/2010 | Baptist et al. |
| 2010/0169415 A1 | 7/2010 | Leggette et al. |
| 2010/0185693 A1 | 7/2010 | Murty et al. |
| 2010/0198888 A1 | 8/2010 | Blomstedt et al. |
| 2010/0198889 A1 | 8/2010 | Byers et al. |
| 2010/0223262 A1 | 9/2010 | Krylov et al. |
| 2010/0303071 A1* | 12/2010 | Kotalwar ............ H04L 61/2507 370/390 |
| 2010/0306270 A1 | 12/2010 | McDiarmid et al. |
| 2010/0306339 A1* | 12/2010 | Ling .................... H04L 67/104 709/213 |
| 2011/0047413 A1 | 2/2011 | McGill et al. |
| 2011/0047620 A1 | 2/2011 | Mahaffey et al. |
| 2011/0055353 A1* | 3/2011 | Tucker .................... H04L 69/32 709/219 |
| 2011/0072206 A1 | 3/2011 | Ross et al. |
| 2011/0087690 A1 | 4/2011 | Cairns |
| 2011/0125814 A1 | 5/2011 | Slik et al. |
| 2011/0153557 A1 | 6/2011 | Bernstein et al. |
| 2011/0161335 A1 | 6/2011 | Dash et al. |
| 2011/0208825 A1 | 8/2011 | Lee et al. |
| 2011/0231374 A1 | 9/2011 | Jain et al. |
| 2011/0238909 A1 | 9/2011 | Kumar et al. |
| 2011/0252204 A1 | 10/2011 | Coon et al. |
| 2012/0066498 A1 | 3/2012 | Engert |
| 2012/0109883 A1 | 5/2012 | Iordanov et al. |
| 2012/0113986 A1* | 5/2012 | Shaffer ................ H04L 1/1854 370/390 |
| 2012/0180070 A1 | 7/2012 | Pafumi et al. |
| 2012/0191771 A1 | 7/2012 | Preston et al. |
| 2012/0202529 A1* | 8/2012 | Mr. Boucher ........ H04L 69/163 455/456.6 |
| 2012/0290870 A1 | 11/2012 | Shah et al. |
| 2012/0331021 A1 | 12/2012 | Lord |
| 2013/0031423 A1 | 1/2013 | Barrow et al. |
| 2013/0060884 A1* | 3/2013 | Bernbo ................ G06F 16/184 709/216 |
| 2013/0086121 A1* | 4/2013 | Preslan .................. G06F 16/13 707/797 |
| 2013/0103851 A1* | 4/2013 | Umeki .................. G06F 16/635 709/231 |
| 2013/0133030 A1 | 5/2013 | Xue et al. |
| 2013/0254314 A1* | 9/2013 | Chow .................. G06F 16/957 709/206 |
| 2013/0268632 A1 | 10/2013 | Baron et al. |
| 2013/0324259 A1 | 12/2013 | McCaffrey et al. |
| 2014/0006796 A1 | 1/2014 | Smith et al. |
| 2014/0173112 A1 | 6/2014 | Seago et al. |
| 2014/0289702 A1 | 9/2014 | McMahon et al. |
| 2014/0298135 A1 | 10/2014 | Dhuse et al. |
| 2015/0156174 A1 | 6/2015 | Fahey |
| 2015/0288659 A1 | 10/2015 | Lukacs |
| 2016/0091948 A1 | 3/2016 | Mitchell et al. |
| 2016/0099963 A1 | 4/2016 | Mahaffey et al. |
| 2016/0259795 A1 | 9/2016 | Brandys et al. |

FOREIGN PATENT DOCUMENTS

| | | |
|---|---|---|
| EP | 0774723 | 7/1998 |
| EP | 0934568 | 6/2003 |
| EP | 1521189 | 4/2005 |
| EP | 1578088 | 9/2005 |
| EP | 1669850 | 6/2006 |
| EP | 1798934 | 6/2007 |
| EP | 2031513 | 3/2009 |
| JP | 6348527 | 12/1994 |
| JP | 11249874 | 9/1999 |
| JP | 2000322292 | 11/2000 |
| JP | 2003030012 | 1/2003 |
| JP | 2003223286 | 8/2003 |
| JP | 2003248607 | 9/2003 |
| JP | 2003271316 | 9/2003 |
| JP | 2004005491 | 1/2004 |
| JP | 2007058275 | 3/2007 |
| JP | 2008250767 | 10/2008 |
| JP | 2009259007 | 11/2009 |
| WO | 1999038093 | 7/1999 |
| WO | 2001018633 | 3/2001 |
| WO | 2002035359 | 5/2002 |
| WO | 2002044835 | 6/2002 |
| WO | 2004053677 | 6/2004 |
| WO | 2006124911 | 11/2006 |
| WO | 2007014296 | 2/2007 |
| WO | 2007115317 | 10/2007 |

(56) References Cited

FOREIGN PATENT DOCUMENTS

| WO | 2007134918 | 11/2007 | |
|---|---|---|---|
| WO | 2008069811 | 6/2008 | |
| WO | 2008102195 | 8/2008 | |
| WO | 2009048726 | 4/2009 | |
| WO | 2010046393 | 4/2010 | |
| WO | WO-2010046393 A2 * | 4/2010 | ............. G06F 16/27 |
| WO | 2010080533 | 7/2010 | |
| WO | 2011131717 | 10/2011 | |

OTHER PUBLICATIONS

International Telecommunications Union, Series X: Data Networks and Open System Communications: OSI Networking and Systems Aspects—Naming, Addressing and Registration, Sep. 2004. ITU-T Recommendation X.667.

Deering, et al., Multicast Routing in Datagram Internetworks and Extended LANs, ACM Transactions on Computer Systems, vol. 8, No. 2, May 1990, pp. 85-110.

Gavrilov, Eugene et al., Distributed Database and Storage, Lections, *Replication., Last Modified on Nov. 20, 2006. Retrieved on Jun. 28, 2017 from http://mai.pmoproject.ru/display/MSP/8.+ Replication.

Handley, et al., Session Directories and Scalable Internet Multicast Address Allocation, Proceedings of the Conference on Applications, Technologies, Architectures, and Protocols for Computer Communication, Aug. 31-Sep. 4, 1998, 12 pages.

Hewlett-Packard, Development Company L.P. et al., HP Volume Shadowing for OpenVMS, OpenVMS Alpha 7.3-2, Sep. 2003, 162 pages.

Katsurashima, et al., NAS Switch: a Novel CIFS Server Virtualization, Proceedings. 20th IEEE/11th NASA Goddard Conference on Mass Storage Systems and Technologies, Apr. 7-10, 2003, pp. 82-86.

Kronenberg, et al., VAXclusters: A Closely-Coupled Distributed System, ACM Transactions on Computer Systems, vol. 4, No. 2, May 1986, pp. 130-146.

Lan, et al., Consistency Maintenance in Peer-to-Peer File Sharing Networks, Aug. 24, 2007, 11 pages.

Lohmann, Niels et al., Petri Net Transformations for Business Processes—A Survey, In: 11 Serious Games 11 2009. Springer International Publishing, Cham 032682. XP55534162, ISSN: 0302-9743, ISBN: 978-3-540-37274-5 vol. 5460. pp. 46-63. DOI: 10.1007/978-3-642-00899-3_3 section 2.3; figure 2.

Parris, et al., Using OpenVMS Clusters for Disaster Tolerance, System/Software Engineer, HP Services-Systems Engineering, 2003, 27 pages.

SAP Library, et al., Queues for Prioritized Message Processing, SAP Exchange Infrastructure, Available online at http://help.sap.com/saphelp_nw04/helpdata/en/04/827440c36ed562e10000000a155106/content.htm, Feb. 6, 2009, pp. 1-2.

squid-cache.org, et al., Squid Configuration Directive Reply_Body_Max_Size, Available online at http://www.squid-cache.org/Doc/config/reply_body_max_size/, Dec. 21, 2008, pp. 1-2.

Suryanarayanan, et al., Performance Evaluation of New Methods of Automatic Redirection for Load Balancing of Apache Servers Distributed in the Internet, Proceedings. 25th Annual IEEE Conference on Local Computer Networks, Nov. 8-10, 2000, pp. 644-651.

Tang, et al., An Efficient Data Location Protocol for Self-Organizing Storage Clusters, Supercomputing, ACM/IEEE Conference, Phoenix, AZ, USA, Nov. 15-21, 2003, 13 pages.

Trustwave, et al., How Do I Block Large Files by Content Size Before Download?, Available online at https://www.trustwave.com/support/kb/article.aspx?id=13166, Mar. 23, 2009, pp. 1-2.

Weatherspoon, et al., Antiquity: Exploiting a Secure Log for Wide-Area Distributed Storage, Proceedings of the EuroSys Conference, ACM 2007, Lisbon, Portugal, Mar. 21-23, 2007, pp. 371-384.

Wikipedia, et al., URL:https://en.wikipedia.org/w/index.php?title=Query flooding&oldid=369549021 as accessed on Aug. 28, 2019.

Wikipedia, et al., FastTrack, Available online at http://de.wikipedia.org/w/index.php?title=FastTrack&01did=83614953, Jan. 8, 2011, pp. 1-2.

Wikipedia, et al., Load Balancing (Computing), Available online at http://en.wikipedia.org/w/index.php?title=Load_balancing_%28computing%29&01did=446655159, Aug. 25, 2011, pp. 1-7.

Wikipedia, et al., Universally Unique Identifier, Available at https://en.wiki~ec!ia.orq/wiki/Universall'1unigue identifier, Aug. 24, 2011, 9 pages.

Zhang, et al., Brushwood: Distributed Trees in Peer-to-Peer Systems Peer-to-Peer Systems,, IV Lecture Notes in Computer Science vol. 3640, 2005, pp. 47-57.

First Office Action received in European Patent Application No. 19169627.7-1213, dated Aug. 26, 2020.

* cited by examiner

DATA RETRIEVAL FROM A DISTRIBUTED DATA STORAGE SYSTEM

CROSS-REFERENCE TO RELATED APPLICATIONS

This application is a continuation of U.S. patent application Ser. No. 14/291,223, filed May 30, 2014 which is a continuation of U.S. patent application Ser. No. 13/224,433, filed Sep. 2, 2011, the contents of which are hereby incorporated by reference herein.

This application includes subject matter that may be related to subject matter included in the following applications: U.S. patent application Ser. No. 13/224,393 entitled "A Method And Device For Maintaining Data In A Data Storage System Comprising A Plurality Of Data Storage Nodes," filed Sep. 2, 2011; U.S. patent application Ser. No. 13/224,404 entitled "Method And Device For Writing Data To A Data Storage System Comprising A Plurality Of Data Storage Nodes," filed Sep. 2, 2011; U.S. patent application Ser. No. 13/224,415 entitled "Method For Data Maintenance," filed Sep. 2, 2011; U.S. patent application Ser. No. 13/224,424 entitled "Method For Handling Requests In A Storage System And Storage Node For A Storage System," filed Sep. 2, 2011; and U.S. patent application Ser. No. 13/224,446 entitled "Method For Updating Data In A Distributed Data Storage System," filed Sep. 2, 2011.

TECHNICAL FIELD

The present disclosure generally relates to methods for retrieving data from a data storage system including a plurality of storage nodes.

BACKGROUND

Data storage systems may include a large number of separate storage facilities. Such systems are becoming increasingly utilized for storing and sharing large amounts of data.

Often data flow between the large number of storage facilities included in in the data storage systems may be complex, and nodes may handle data acquisition requests from numerous nodes in the data storage system. Additionally, to decrease the risk of data corruption and to avoid losing data a redundant data storage system may be employed. For example, identical copies of the data may be stored at several storage facilities.

In addition, the data storage system may comprise various safety mechanisms, making the system more robust. However, the safety mechanism may add complexity to the system.

Although data may be read into and out of distributed storage systems, accessing data in the system may be burdensome or may require complex processing. Several storage nodes may be involved in both read and write operations.

SUMMARY OF THE INVENTION

A method for rendering the retrieval of data from a data storage system including a plurality of storage nodes is disclosed. The method may be faster and/or more efficient than previous methods.

According to an embodiment, there is provided a method for retrieving data from a data storage system including a plurality of storage nodes. The method may include sending a multicast (e.g., broadcast) message to at least a subset of the storage nodes. A multicast message may include a request for the identification of the subset of storage nodes to send the data. The multicast messages may further include a data identifier, which may indicate the data to be retrieved. The method may include receiving data from a first storage node of the subset of storage nodes. The data received from the first storage node may correspond to the requested data. Moreover, at least the act of sending a multicast message or the act of receiving data from the first storage node may be performed on a condition that an estimated size of the data is less than a predetermined value.

The method may be embodied as software/hardware combination which may be executed on a server or some other data retrieving device. In another example, the method may be embodied as software/hardware implementation which may be executed on one or several storage nodes included in the data storage system.

The data storage system may include a plurality of storage nodes. At least one of these storage nodes may store the data to be retrieved.

The multicast message may be directed to all or a subset of the storage nodes. One reason for directing the multicast message to a subset of the storage nodes may be that some of the storage nodes included in the data storage system may suffer from a temporary, or in another example persistent, malfunction. For example, the connection to some of the storage nodes may be down, temporarily or persistently.

As an example, rather than receiving information about which of the storage nodes may store the requested data, an instance of the requested data may be received directly, without additional communication with the storage nodes.

Thus, the number of communications between the storage nodes and a data retrieving device may be reduced. For example, the requested data may be received from a first storage node directly as a response to a multicast message, optionally along with additional information such as related storage location information. The additional information may include information regarding locations where the requested data is stored.

In an example, rather than receiving a reply message from each or some of the plurality of storage nodes as a response to the initial multicast message, wherein the reply message include storage location information about where the data to be retrieved is stored, the replies may directly include the data to be accessed, for example based on a determination that the size of the data is below a certain threshold value. In this example, rather than retrieving the data by means of an additional dedicated unicast communication to those storage nodes storing the data based on the storage location information received in the response to the multicast message, the data may be received directly. Thus, the method for retrieving data may involve fewer operation or communications between storage nodes.

Thus, in view of the above, the retrieval of data from a data storage system including a plurality of storage nodes may be rendered more effective.

According to an embodiment, the act of sending a multicast message and the act of receiving data from the first storage node may be performed on a condition that an estimated size of the data is less than a predetermined value. For example, when handling large amounts of small quantities of data, the method may be performed very efficiently, while at the same time avoiding the risk of undesired transmittals of large quantities of data which might overload or slow down the system.

An estimated size of the data may be established according to previous data retrievals, expectations of a typical size of data retrievals, and/or according to a method of weighing various factors to produce an estimated size of the data. For example, for data that may be frequently requested, information learned from previous requests (e.g., data size, location, file type, etc.) may be used to estimate the current size of the data. For example, these data quantities may be known to be modified in relatively small portions from one data retrieval to the next.

According to an embodiment, the data received from the first storage node may include reference data, which may correspond to the requested data, on a condition that the size of the data exceeds the predetermined value. For example, undesired transmittals of large quantities of data may be avoided. Instead of sending the requested data, reference data corresponding to the requested data may be received. The reference data may comprise information about an unsuccessful sending of the requested data and/or information about an actual size of the data (as opposed to an estimated size of the data), a current load condition, a free storage space available in the first storage node, a system age of the first storage node, position information about the first storage node, and/or the like.

According to an example, the method may further include analyzing whether the data received from the first storage node fulfills a set of criteria. The set of criteria may be predetermined or change with time according to an evaluation by a storage node and/or server. For example, the set of criteria may include a desired or accepted integrity state of the data, a required maximal or minimal size of the data, whether portions of the data have been received before, and/or the like. The reliability and robustness of the data storage system may be improved by considering such factors when determining what data may be transmitted and what data may be transmitted in the form of a reference.

In an example, portions of the received data may be analyzed by using a comparison to reference data; for example, reference data may be employed when a small portion of the received data differs from the reference data.

According to an embodiment, the method may further include discarding the data received from the first storage node based on the analysis. Improved reliability and robustness may be obtained. For example, the analysis may determine that some instances of the data may not be acceptable instances of the data. For example, acceptable instance may comply with a certain set of criteria, such as a desired integrity state of the data. The instances that comply with the criteria may be retrieved from the data storage system, while instance that do not comply may be ignored.

According to an example, the act of sending a multicast message and the act of receiving data from the first storage node may be repeated based on the analysis. In case the data does not fulfill a set of desired criteria, the process of retrieving the requested data may be repeated until an acceptable instance of the data is obtained. Optionally, a maximum, predetermined number of repetitions may be established, and the process may be halted once the maximum is reached.

According to an embodiment, the method may further include receiving data from a second storage node of the subset of storage nodes. The data received from the second storage node may correspond to the requested data. The data may be received from the second storage node in a manner similar to the method employed to receive data from the first storage node. In addition, in case the received data from the first storage node is corrupted, the data received from the second storage node may be utilized to ensure the data is accurate/and or to correct the corrupted data. Also, the first storage node may be suffering from a temporary or persistent malfunction, and the second storage node may serve as a backup storage node.

For example, the method may further include receiving data from more than two storage nodes of the subset of storage nodes.

According to an embodiment, the method may further include analyzing whether the data received from the first storage node and the data received from the second storage node fulfill a set of criteria. By accessing the first as well the second storage node, the two instances of data may be compared to each other, for example by means of a checksum or the like, and analyzed to establish whether the set of criteria are fulfilled.

As an example, if the data received from the first and second storage nodes are in compliance as determined by the analysis, a further process to receive data from additional storage nodes, such as additional instance of the data, may be stopped or interrupted.

According to an example embodiment, the method may further include discarding at least one of the data received from the first storage node and the data received from the second storage node based on the analysis. As explained above, the discarding may ensures that acceptable instances of data, according to a certain set of criteria, are retrieved from the data storage system, while corrupted or out-of-date data may be discarded.

If the data received from the first and second storage nodes both are considered to be acceptable as a result of the analysis, a further selection procedure may be initiated to select one of them and to discard the other. The selection procedure may be based on a current load condition, geographical positions, and/or other selection criteria. of the first and second storage nodes, respectively. Note, however, that also other types of selection procedures may be possible.

In an example, rather than discarding the data that is not selected, the data may be saved. At least one of the data received from the first storage node and the data received from the second storage node may be stored as reference data for future analysis.

According to an example, the act of sending a multicast message and at least one of the act of receiving data from the first storage node and the act of receiving data from the second storage node may be repeated based on the analysis. For example, the instances of the requested data may have unacceptable qualities, a repetition of the acts of sending and receiving may be performed.

The act of sending a multicast message and at least one of the act of receiving data from the first storage node and the act of receiving data from the second storage node may be repeated until an acceptable instance of the requested data is obtained. Optionally, only a maximum, predetermined number of repetitions may be permitted.

According to an embodiment, the data received from the first storage node may be sent by means of unicast communication.

According to an embodiment, the method may further include determining whether a capability of the first storage node fulfills a set of characteristics. The capability of the first storage node may be at least one of a current load condition of the first storage node, an expected or estimated load condition of the first storage node, information about a free storage space available in the first storage node, information about a system age of the first storage node, position information about the first storage node, and/or the like.

The sending of the requested data from the first storage node may be selected according to a queue scheme in relation to other storage nodes included in the data storage system. Information about such capabilities may be stored at the first storage node or, optionally, at some other storage nodes included in the data storage system. For example, this information may be stored at other devices outside of the data storage system, such as at a server in communication with the data storage system.

According to another example, the method may further include determining whether a capability of a communications network connecting the plurality of storage nodes fulfills a set of characteristics. The plurality of storage nodes and a data retrieving device, such as a server, may be connected to each other via a communications network, such as a Local Area Network, a Wide Area Network and/or the Internet. The capability of the communications network may, for example, be a current connection speed to each of the storage nodes or the data retrieving device, a type of connection associated to each of the storage nodes or the data retrieving device, and or the like.

According to an embodiment, the data received from the first or second storage node may include a collection object including a reference to data of the data storage system. The data may include at least one of a set of another collection object or a data file other than a collection object.

According to an embodiment, a server may be adapted to retrieve data from a data storage system that includes the plurality of storage nodes. The server may include a transmitter adapted to send a multicast message to at least a subset of the storage nodes. The multicast message may include a request for the subset of storage nodes to send the data. The sever may also include a receiver adapted to receive data from a first storage node of the subset of storage nodes. The data received from the first storage node may correspond to the requested data.

Thus the sever may access data stored on the plurality of storage nodes. In an example, the server may act as a storage node in the system.

Other features of the disclosed embodiments will become apparent to those skilled in the art upon review of the following drawings, the detailed description, and the appended claims.

BRIEF DESCRIPTION OF THE DRAWINGS

The above, as well as additional objects and features will be better understood through the following illustrative and non-limiting detailed description of embodiments disclosed herein, with reference to the appended drawings, where like reference numerals may be used for like elements.

DETAILED DESCRIPTION

Figure 1:
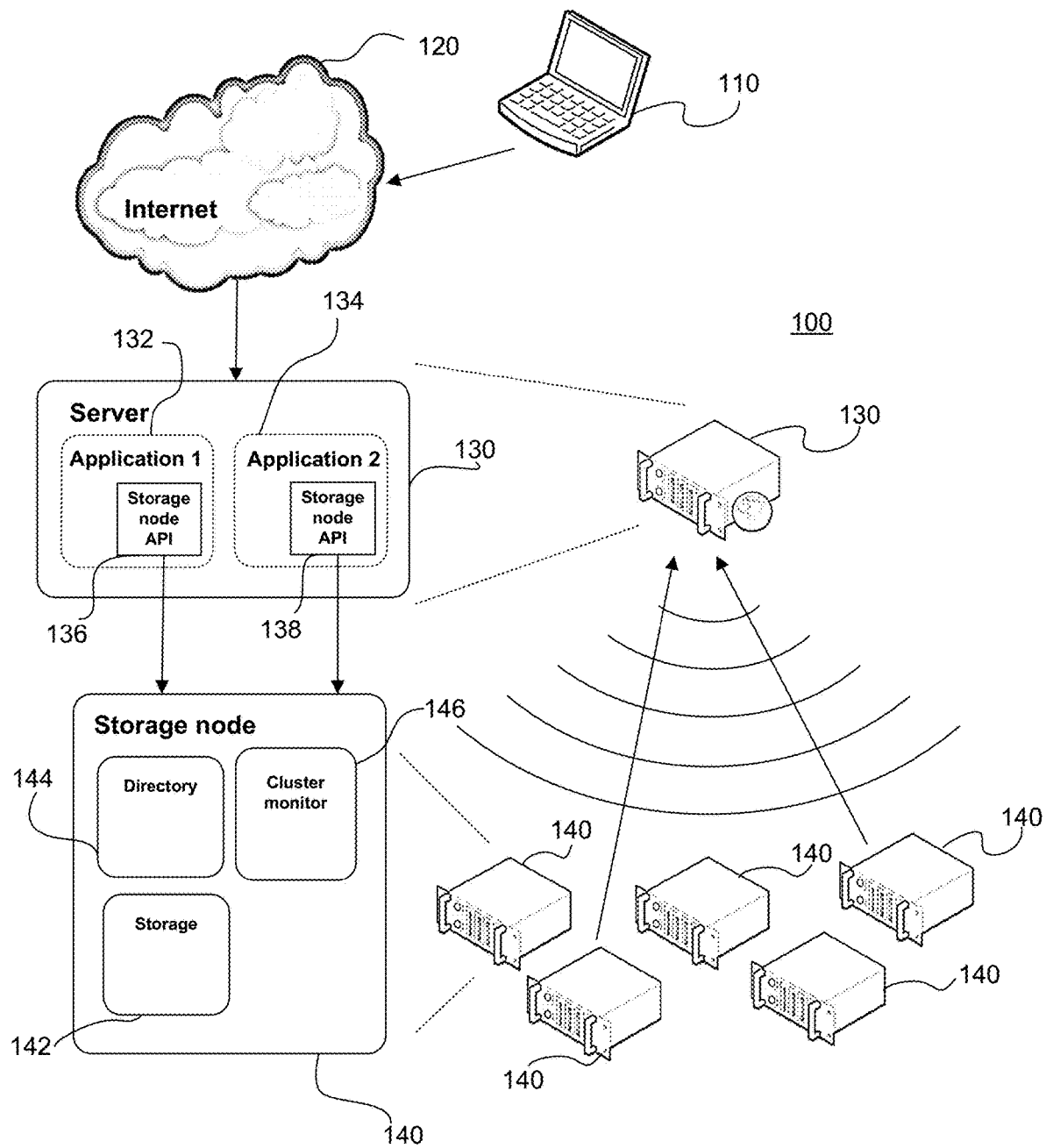
FIG. 1 illustrates an example embodiment of a distributed storage system.

The structure of an example embodiment of a distributed data storage system 100 is outlined schematically in FIG. 1. The distributed data storage system 100 may include a plurality of storage nodes 140. Storage nodes 140 may communicate with server 130, which may be a data retrieval device. The system may be reliable and robust. For example, in U U.S. patent application Ser. No. 13/125,524, filed Apr. 21, 2011, the contents of which are hereby incorporated by reference herein, there is disclosed a method for maintaining data in the data storage system by replicating data files at the various storage nodes when needed. The system according to U.S. patent application Ser. No. 13/125,524 may therefore be considered to be self-healing.

FIG. 1 illustrates a client-server configuration, according to which a user computer 110 may access applications 132, 134 for example via the Internet 120. Applications 132, 134 may run on a server 130. In FIG. 1, two applications 132, 134 may run on the server 130. It is understood, however, that any number of applications may run on the server 130. Each application 132, 134 may include an API (Application Programming Interface) 136, 138 which may provide an interface in relation to the distributed data storage system 100. API 136, 138 may support requests, typically write and read requests, from an applications running on the server. From an the point of view of an application, reading or writing information from/to the data storage system 100 may be transparent. For example, the application may view the distributed data storage system as any other type of storage solution, for instance a file server or a hard drive.

Each API 136, 138 may communicate with storage nodes 140 in the data storage system 100. The storage nodes 140 may communicate with each other. Each storage node 140 may include a network interface card (NIC) so that a storage node may receive and send data to/from other storage nodes 140 and the server 130. These communications may be based on TCP (Transmission Control Protocol) and UDP (User Datagram Protocol).

Different APIs 136, 138 on the same server 130 may access different sets of storage nodes 140. There may exist more than one server 130 which accesses each storage node 140. Additional servers, however, may not significantly affect the way in which the storage nodes operate.

The components of the distributed data storage system may be the storage nodes 140 and the APIs 136, 138 in the server 130 which access the storage nodes 140. The present embodiment as illustrated in FIG. 1 may relate to methods carried out in the server 140. In another example, however, the methods may be carried out in one, or several, of the storage nodes 140. Those methods may be embodied as combination software/hardware implementations which are implemented on the server 130, or on one or more of the storage nodes 140. The methods may define the operation and the properties of the overall distributed data storage system.

The storage node 140 may typically be embodied by a file server which is provided with a number of functional blocks. The storage node may thus comprise a tangible storage medium 142, which typically comprises of a number of internal (e.g. connected via Integrated Device Electronics (IDE) or Serial Advanced Technology Attachment (SATA) or external hard drives (e.g. connected via USB or Firewire), optionally configured as a RAID (Redundant Array of Independent Disk) system. Other types of storage media are however conceivable as well.

The storage node 140 may further include a directory 144, which may include lists of data entity/storage node relations as a host list.

In addition to the host list, each storage node 140 may further contain a node list including the IP addresses of storage nodes in its set or group of storage nodes. The number of storage nodes in a group may vary from a few to hundreds of storage nodes. The node list may further have a version number.

Additionally, the storage node 140 may further include a cluster monitor block 146. The cluster monitor block 146 may be configured to carry out monitoring of other storage nodes 140 in the data storage system 100.

The storage nodes 140 of the distributed data storage system 100 may be considered to exist in the same hierarchical level. In an example, there may be no permanent master storage node that is responsible for maintaining a directory of stored data entities and monitoring data consistency, etc. Instead, all storage nodes 140 may be considered equal, and may, at times, carry out data management operations vis-a-vis other storage nodes in the system. This equality may ensure that the system is robust. In case of a storage node malfunction, other nodes in the system may cover up the malfunctioning node and ensure reliable data storage.

According to the embodiment as illustrated in FIG. 1, the server 130 may exist at a different hierarchy level than the storage nodes 140. It is noted, however, that the server functionality as described in the present context may equally well be implemented in any, or several, of the storage nodes 140 included in the data storage system. This alternative implementation of the server functionality may give rise to a different, equally applicable, hierarchical structure of the data storage system.

Figure 2A:
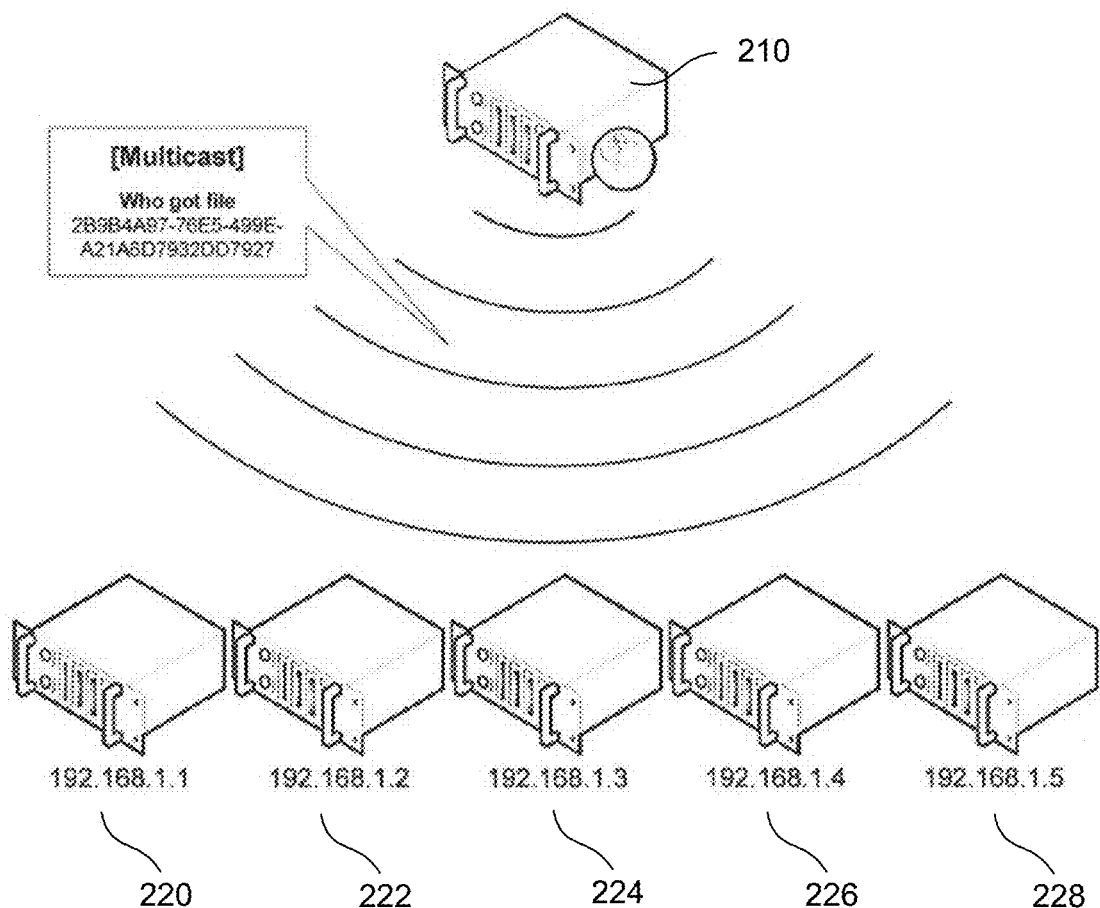
FIGS. 2a-b schematically illustrate an example embodiment of a data retrieval process.
Figure 2B:
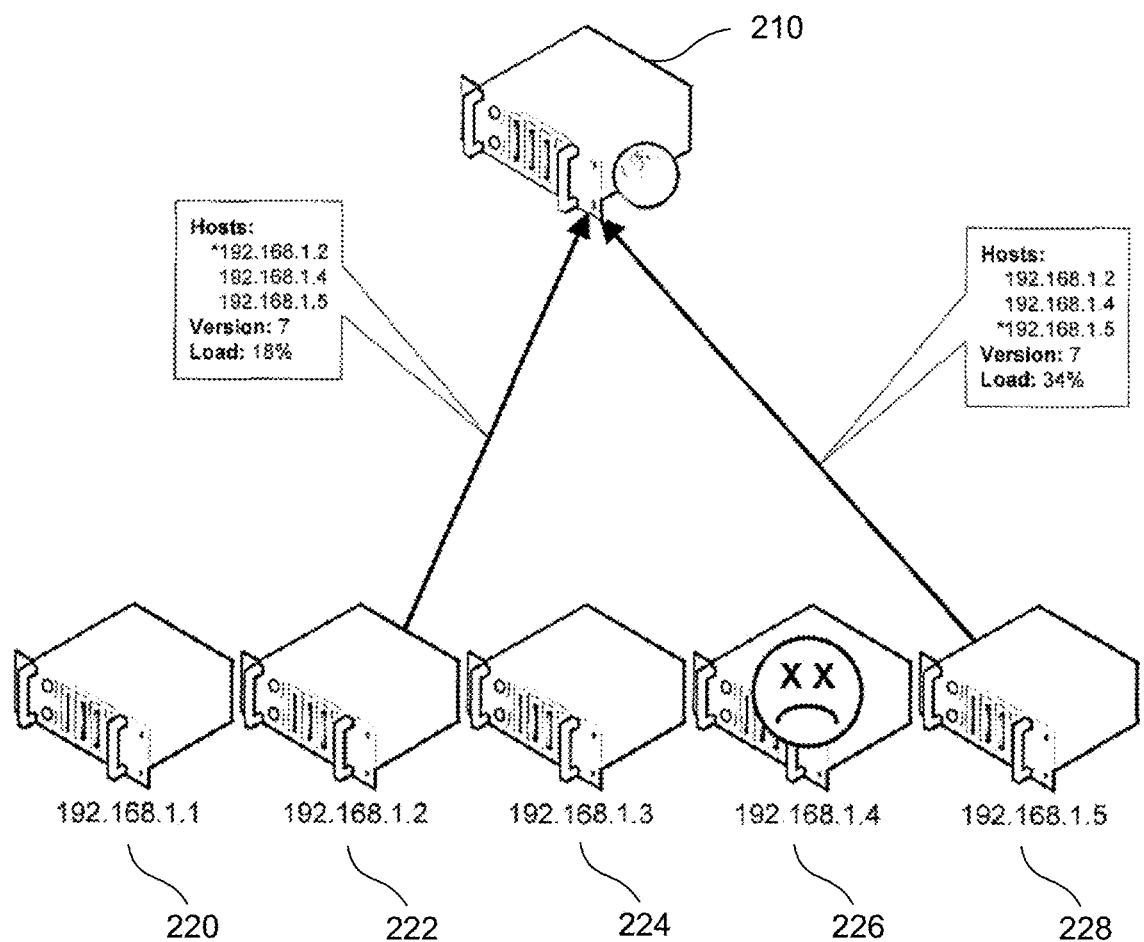
Figure 3:
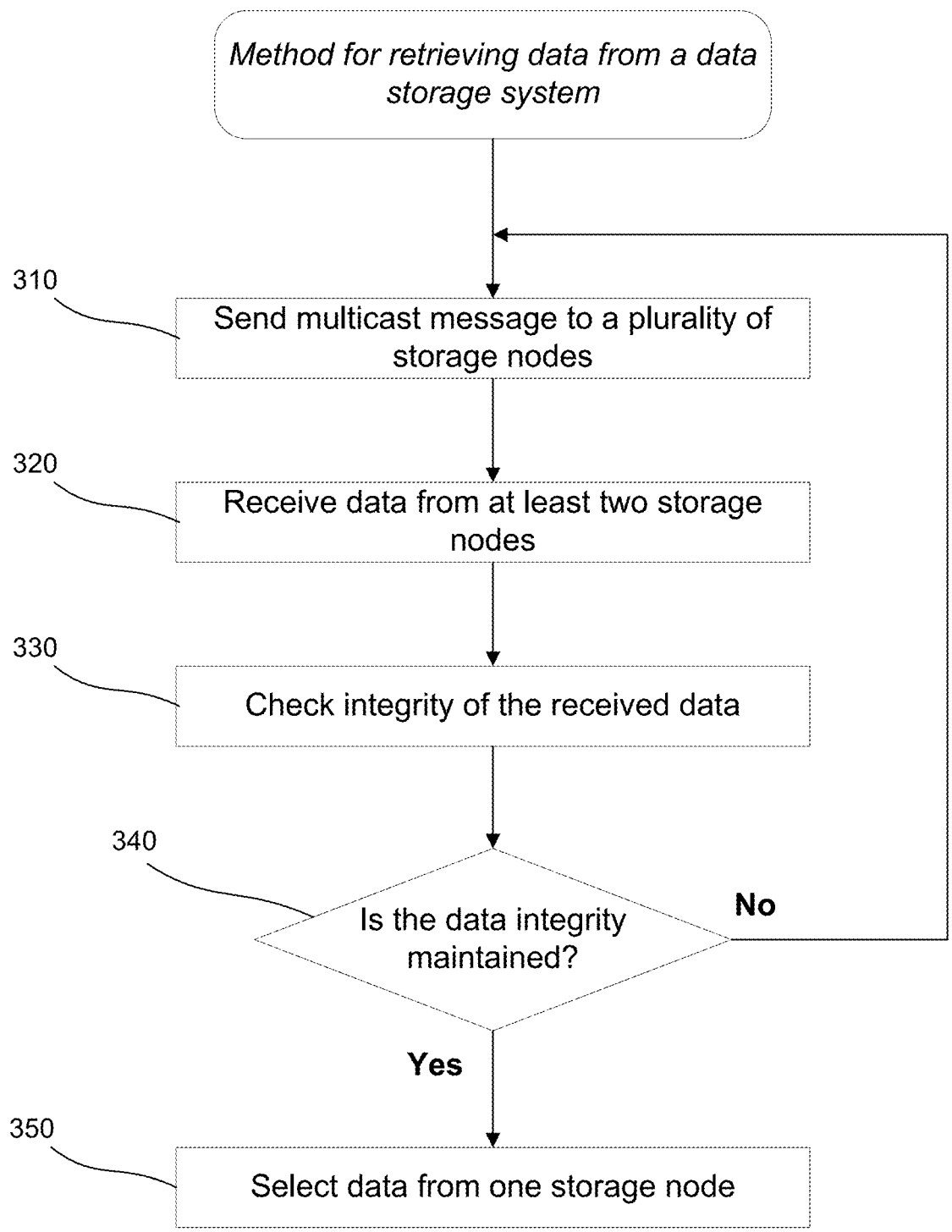
FIG. 3 is a flow chart illustrating an example embodiment of the method for retrieving data from a data storage system.

In the following, the operation of the data storage system may be described with reference to FIGS. 2a-b and 3. More specifically, the method of retrieving data from the data storage system may be outlined. FIGS. 2a-b schematically illustrate an example embodiment of a data retrieval process while FIG. 3 illustrates a corresponding flow chart of an example method for retrieving data.

The data, or data set, to be retrieved from the data storage system may be one or several data files, a folder comprising data files or additional folders, a computer-readable collection object including a set of computer-readable references, and/or the like.

In more detail, the collection object may include a reference to data of the data storage system, the data including at least one of a set of one or more collection objects and data files, other than a collection object. A reference may be a reference to another collection object stored in the data storage system. A reference may also be a reference to one or more computer-readable data files, other than the collection objects, stored in the data storage system. A reference may include a pointer (e.g. a memory address) to a storage location at a storage node. A reference may include an identifier of the collection object or data file referred to.

A collection object may be embodied as a directory in a file system of a storage node. Data files referenced in the collection object may be data files stored in the directory. Collection objects referenced in the collection object may represent subdirectories stored in the directory.

A collection object may also be embodied as a file having a predetermined format. The file may be a special file in the file system of the storage medium. Alternatively, the file may be a data file in the file system of the storage medium. Such a file may be readable using the same routines of the file system as the data files. For example the file may be a plain text file including references to collection objects and/or data files.

The reading or retrieval of data, as well as other functions in the system, may utilize multicast communication to communicate simultaneously with a plurality of storage nodes. By a multicast or IP multicast is here meant a point-to-multipoint communication which may be accomplished by sending a message to an IP address which is reserved for multicast applications.

For example, a message, typically a request, may be sent to such an IP address (e.g. 244.0. 0.1), and a number of recipient servers may be registered as subscribers to that IP address. Each of the recipient servers may have its own IP address. When a switch in the network receives the message directed to 244. 0.0.1, the switch may forward the message to the IP addresses of each server registered as a subscriber.

In principle, a single server may be registered as a subscriber to a multicast address, in which case a point-to-point, communication may be achieved. However, in the context of this disclosure, such a communication may nevertheless considered a multicast communication since a multicast scheme is employed.

Unicast communication may also be employed. Unicast communication may be a communication with a single recipient.

With reference to FIG. 2a and FIG. 3, the method for retrieving data from a data storage system may include sending (box 31 0) of a multicast message to a plurality of storage nodes 220, 222, 224, 226 and 228. In the illustrated case there are five storage nodes each having an IP (Internet Protocol) address 192. 168.1. 1, 192.168.1.2, etc. The number of storage nodes is, needless to say, just an example. In this example, the query contains a data identifier "2B9B4A97-76E5-499E-A21A6D7932DD7927", which may for instance be a Universally Unique Identifier (UUID). The multicast message may include a request for each of the storage nodes to send a specific data set on a condition the data set is stored at the storage node in question.

The storage nodes 220, 222, 224, 226 and 228 may scan themselves for data corresponding to the identifier. If such data is found at some of the storage nodes, a response may be sent which may be received (box 320) by the server 210, cf. FIG. 2b. More specifically, each of the storage node/nodes storing the requested data set, in this illustrative example storage nodes 222 and 228, may transmit a response to the server 210. The response may include an instance of the requested data set from the storage node/nodes in question, which in FIG. 2b are illustrated by 222 or 228.

As illustrated, the response may optionally contain further information in addition to an indication that the storage node has an instance, or copy, of the requested data. For example, the response may contain information from the storage node directory about other storage nodes containing the data, storage location information, information regarding which version of the data set is contained in the storage node, information about which API, and/or which server, that created the version of the data set that is contained in the storage node, information about a free storage space available at the storage node, information about a system age of the storage node, and/or information regarding which load the storage node at present is exposed to.

If, on the other hand, the data set is not stored at a particular storage node, this storage node may be silent or may send reference data to the server. This reference data may include information that the requested data set is not stored at the storage node in question and/or may include information about the storage node, such as a current load condition, information about a current data storage availability, storage location information, information about a system age of the storage node, and/or the like.

The received data sets from the storage nodes 222 and 228 may then be analyzed to check whether at least one instance of the requested data set has a maintained integrity (box 330). A maintained data integrity of a data set may correspond to the data set being similar as compared to an original data set, up to certain acceptable data discrepancies. The integrity check may ensure the data is accurate, for example the integrity check may ensure the data set is an accurate copy of the original.

The act of analyzing may be implemented by analyzing received data from one storage node, from two storage nodes, or alternatively from several, storage nodes. The analysis of the data integrity may, for example, be performed in the server 210. For example, the analysis may be implemented by means of a checksum algorithm, a cryptographic hash function such as MD5 (Message-Digest Algorithm), a comparison of portions of some or all of the different instances of the requested data set, a comparison with a reference data set, and/or the like.

As a consequence of the analysis, it may be established whether the integrity of some of the received data sets from the storage nodes 222, 228 meets a desired quality threshold (box 340). If at least one instance of the requested data set meets the desire quality threshold, one of the instances that meets the threshold may be selected (box 350). If several instances of the requested data set have met the quality threshold, one of these may be selected depending on a set of additional requirements. These requirements may for instance include a current load condition of the storage nodes, geographical positions of the storage nodes, a system age of the storage nodes, etc. Alternatively, the storage node having the latest version of the requested data set and/or the lowest load may be selected.

In one example, one instance of the requested data set that meets the quality threshold, for example the received data from the storage node 222, may be selected. The received data set from the other storage node 228 may be discarded irrespective of whether this data set also meets the desired quality threshold. In another example, the received data set from the other storage node 228 may be stored as reference data, for example at the server 210. Upon selecting a data set that meets the quality threshold, the server may stop analyzing integrity of additional data sets.

Optionally, if the integrity of the at least one instance of the requested data set meets the quality threshold, a further analysis of the data sets received from additional storage nodes may be stopped or interrupted.

In one example, a number of instances of the requested data set, say two instances, may be compared. If these two instances agree as to a desired accuracy (e.g. they are the same or substantially similar) or comply with a desired integrity state of the data, and the checking of additional received data set may be interrupted or stopped.

In another example, the comparison between different instances may be interrupted when a certain fraction of the total number of instances agrees to a desired accuracy. Example fractions may be 50%, 60% or 70%, but also other fractions may be equally conceivable.

A desired accuracy may be that the compared data sets fully agree, certain portions of the compared data sets fully agree, etc. In some instances, however, a less strict desired accuracy may be sufficient.

The data integrity may be lost for example when the connection between the server 210 and some of the storage nodes 220, 222, 224, 226 or 228 is corrupted so that the transfer of the requested data set fails, or when the data storage system suffers from some other malfunction. In FIG. 2b, the storage node 226 stores the requested data set, but may malfunction and may therefore not transmit an instance of the requested data. Optionally, if a transfer of data from some of the storage nodes fails, the server may select another storage node, or set of storage nodes, for the retrieval of data.

If no instance of the requested data set from the storage nodes 222, 228 meets the desired quality threshold, a new multicast message may sent to the storage nodes (box 310), and the procedures described with reference to boxes 320, 330 and 340 may be repeated. The loop thus formed by the boxes 310, 320, 330 and 340 may be reiterated until an instance of the requested data set that meets the desired quality threshold has been received from some of the storage nodes 220, 222, 224, 226 or 228, and/or until a predetermined number of iterations have been performed.

Optionally, the server 130 may send a unicast message to a storage node associated with a data set having a lost integrity (e.g., the data set from this node may not meet the desired quality threshold). The message may include information about the nature of the failed transfer, information about the received data set, the correct data, and/or the like.

An embodiment may be implemented in a data storage system where the majority of the files are small and a minority of the data sets to be handled are large. The definitions of small or large data set depends on the system capabilities, such as connection speeds between the various entities comprised in the system, storage capabilities, etc. The definitions may vary from system to system (e.g. "small" may imply data blocks with sizes less than or equal to 512 kB or less than a predetermined fraction of the data bandwidth available in the system).

If the majority of the data sets to be handled by the system are considered to be small, it may be assume that the size of all the data sets to be retrieved are small. Moreover, if the size of the data to be retrieved exceeds a predetermined value, the transmittal of the data may be stopped, interrupted or may not occur. For example, the transfer from the storage node storing the data, as well as from the additional storage nodes storing instances of the data, to the server may be halted or interrupted. This decision to stop the transfer of large files may be made locally at the storage nodes storing the data to be retrieved. Optionally, the decision may be made by the server.

In another example, the storage nodes storing the data to be retrieved may send reference data back to the server including information about the sizes and the storage locations of the data sets which were supposed to be sent, file handles, and/or additional relevant information about the storage nodes. The additional information may include a current load condition, a free storage space available, a system age, position information, and/or the like. In addition, the reference data may include instructions for the server to retrieve the data set from a particular set of the storage nodes storing the requested data. In one example, the data set may be retrieved from one particular storage node by means of a unicast communication.

It may occur that a data set stored at two or more storage nodes 140 may be updated or created substantially simultaneously by two different APIs 136, 138. Such a situation may give rise to different versions of the data set at different storage nodes and thereby giving rise to a conflict when retrieving the data according to the present inventive concept. These APIs 136, 138 may be included in the same, or alternatively, at different servers. The contents of the respective creation or updating processes may differ, thereby giving rise to versions of the data set having different contents. In this case, a selection procedure may be initiated in which one of the versions are selected and thereafter stored at the different storage nodes. Optionally, all or some of the different versions may be stored at the storage nodes.

Two APIs (e.g. API1 and API2) may be in the process of updating a data set which is stored at three different storage nodes (e.g. storage nodes SN1, SN2 and SN3). The data sets stored at the respective storage nodes may each be associated with a specific version number. Each of the data sets may also be associated with information about which API updated the particular version of the data set. This version number and API information may be stored in the data sets at the storage nodes as well as at the APIs. In the following example, the version number V and API information N are collectively denoted by the version data (VIN). For example, the version data (3412) represents the version number 34 of the data set has been updated by the second API (i.e. API2).

The storage nodes may be arranged to send acknowledgements to at least one of the APIs. The acknowledgement may include information about whether the updating process was successful or not. The acknowledgements may include the version data, i.e. (VIN), associated to the updated data set.

For example, at a particular time instant, all the data sets may have the same version number, for example, version number V=25. The data sets stored at the first two storage nodes (e.g. the storage nodes SN1 and SN2) may have both previously been updated by the first API (e.g. API1). However, before the first API had the time to do so, the second API (e.g. API2) may have managed to update the data set stored at the third storage node (e.g. storage node SN3). Put differently, the first API may have updated the data sets stored at the first and second storage nodes with version 25 before the second API had the time to do so. The acknowledgements sent back to the APIs, as well as the information stored at the storage nodes, thereby may include the version data (2511), (2511) and (2512), for the data sets stored at the first, second and third storage node, respectively.

Thus, when the first API at a subsequent time instant attempts to update the third storage node with its version 25 of the data set, the updating may be halted or may not occur since there is already a version 25 stored at the third storage node as sent from the second API. Moreover, when the second API at a subsequent time instant attempts to update the first and second storage nodes, the updating of these may not occur, since there are already versions 25 at the first and second storage nodes as sent from the first API.

The APIs receiving the acknowledgements including the version data may be arranged to instruct the storage nodes included in the data storage system 100 to utilize and store the data set having the version data (VIN) of the data set which is most frequently occurring in the received acknowledgements. For example, if the version data (VINmax) of the data set occurs in more than 50% of the acknowledgements, this data set may be maintained and distributed to other storage nodes storing other versions of the data set. In the following, the data set associated to a version data (VIN) may be referred to as a correct and a wrong version of the data set, depending on whether the data set is the most frequently occurring or not, respectively.

The APIs may be arranged to send instructions to the storage nodes keeping the wrong versions to delete the wrong versions of the data set. Moreover, wrong versions of the data set may be replaced or amended by the correct versions of the data set at these storage nodes by means of the APIs instructing the storage nodes to send the correct version. For example, the other storage nodes included in the data storage system 100 may send the correct version e.g. according to the method as disclosed in U.S. patent application Ser. No. 13/125,524. It should be noted that the wrong versions of the data set may be replaced or overwritten. In another example, the wrong versions may be amended, in which case the parts of the correct version which differ from the wrong version in question may be added to the wrong version of the data set. Thereby, the data from the wrong versions may be kept in the data storage system.

Thus, in the example involving the three storage nodes and the two APIs, version 25 as sent from the first API, e.g. having version data (2511), may be kept as the correct version 25, since this version had been successfully stored at two storage nodes (i.e. SN1 and SN2).

In an example, the data set sent from the second API (i.e. API2) to the third storage node (i.e. SN3), which was deduced to be the wrong version according to the above, may be resent to all of the storage nodes with a new version number, e.g. version number 26. This data set may then be associated with the version data (2612). After the selection procedure has been performed, the process of retrieving data according to the methods described above may be repeated.

The above description illustrated several example, and the methods and system disclosed were described with reference to a limited number of examples. However, as is readily appreciated by a person skilled in the art, other examples than the ones disclosed above are equally possible within the scope of the disclosure, and the breadth of the protection should be judged as defined by the appended claims.

What is claimed:

1. A method for retrieving data from a data storage system, the data storage system including a plurality of storage nodes, the method comprising:
    sending a multicast message to the plurality of storage nodes requesting data on condition that an estimated size of the data is less than a predetermined value, the multicast message including a data identifier that identifies the requested data; and
    receiving, in response to the multicast message, a reference to the requested data or the requested data from a first storage node of the plurality of storage nodes, wherein the requested data is received on condition that a size of the requested data is less than or equal to a predetermined value and the reference to the requested data is received on condition that the size of the requested data exceeds the predetermined value.

2. The method according to claim 1, wherein the estimated size of the data is established according to previous data retrievals.

3. The method according to claim 1, wherein the estimated size of the data is established according to a typical size of data retrievals.

4. The method according to claim 1, wherein the estimated size of the data is established according to a method of weighing various factors that include data size, location, and file type from previous data retrievals.

5. The method according to claim 1, wherein the sending of the multicast message is performed on the condition that the estimated size of the data is less than the predetermined value.

6. The method according to claim 1, wherein when the reference to the requested data is received on condition that the size of the requested data exceeds the predetermined value, reference data indicating information about an actual size of the requested data is also received from the first storage node.

7. The method according to claim 1, wherein when the reference to the requested data is received on condition that the size of the requested data exceeds the predetermined value, reference data indicating information about an unsuccessful sending of the requested data is also received from the first storage node.

8. The method according to claim 1, wherein when the reference to the requested data is received on condition that the size of the requested data exceeds the predetermined value, the method further comprises:
retrieving the requested data from the first storage node by means of a unicast communication.

9. The method according to claim 8, wherein fewer communications are involved to retrieve the requested data when the requested data is received in response to the multicast message on condition that the size of the requested data is less than or equal to the predetermined value as compared to when the reference to the requested data is received on condition that the size of the requested data exceeds the predetermined value.

10. The method according to claim 1, wherein when the requested data is received in response to the multicast message on condition that the size of the requested data is less than or equal to the predetermined value, the method further comprises:
analyzing the data received from the first storage node to determine if the data fulfills a set of criteria; and
repeating the sending of the multicast message to the plurality of storage nodes based on the analysis.

11. A server for retrieving data from a data storage system, the data storage system including a plurality of storage nodes, the server comprising:
a transmitter configured to send a multicast message to the plurality of storage nodes requesting data on condition that an estimated size of the data is less than a predetermined value, the multicast message including a data identifier that identifies the requested data; and
a receiver configured to receive, in response to the multicast message, a reference to the requested data or the requested data from a first storage node of the plurality of storage nodes and to receive, in response to the multicast message, a reference to the requested data or the requested data from a second storage node of the plurality of storage nodes and, wherein the requested data is received on condition that a size of the requested data is less than or equal to a predetermined value and the reference to the requested data is received on condition that the size of the requested data exceeds the predetermined value.

12. The server according to claim 11, wherein the estimated size of the data is established according to a typical size of previous data retrievals.

13. The server according to claim 11, wherein the estimated size of the data is established according to a method of weighing various factors that include data size, location, and file type from previous data retrievals.

14. The server according to claim 11, wherein the transmitter is configured to send the multicast message on the condition that the estimated size of the data is less than the predetermined value.

15. The server according to claim 11, further comprising:
a processor configured to analyze the data received from the first storage node to determine if the data fulfills a set of criteria and analyze the data received from the second storage node to determine if the data received from the second storage node fulfills the set of criteria;
wherein the transmitter is configured to repeat the sending of the multicast message to the plurality of storage nodes based on the analyses.

* * * * *